United States Patent Office 2,829,427
Patented Apr. 8, 1958

2,829,427
SINTERED REFRACTORY MATERIAL

Skon Tacvorian and Marcel Levecque, Paris, and René Leclerc, La Roche, Toulouse-Pouvourville, France, assignors to Office National d'Etudes et de Recherches Aeronautiques, Chatillon-sous-Bagneux, France No Drawing. Application April 14, 1953
Serial No. 348,808

Claims priority, application France October 13, 1948

15 Claims. (Cl. 29—182.5)

This application is a continuation-in-part of application Serial No. 194,737, filed November 8, 1950 and now abandoned, which is a continuation-in-part of application Serial No. 104,794, filed July 14, 1949 and now abandoned.

This invention relates to sintered refractory materials.

The use of sintered alumina has previously been suggested for cutting tools and attempts have been made to improve the mechanical characteristics of sintered alumina by adding thereto small amounts of oxides of chromium, iron, vanadium, or manganese, and so forth. However, while the hardness of the products thus obtained is equivalent to that of plates of metallic carbides, their great fragility in use has not enabled their practical use. It is believed that such fragility is due in part to the low resistance of alumina to "thermal shock," that is to say to sudden temperature variations.

Another alumina-base material is also known which contains iron. While this type of material exhibits improved behaviour in respect to thermal shock up to about 900° C., it has been found not to retain its mechanical qualities with time.

Besides, some writers have also given lists of elements and mentioned that in associating one element taken in a list with another taken from another list, it is possible to obtain a refractory composition. But, this prescription is so vague that a technician could carry out hundreds, if not thousands, of experiments before selecting some of these compositions.

It is an object of this invention to provide a material which may be used wherever high resistance to creep at high temperature and/or to thermal shock and/or oxidization and/or erosion are required.

In this connection, the invention contemplates the application of said material to the construction of heat engine elements, especially turbine blades and propulsion jet nozzles.

According to the invention, the material comprises a refractory oxide or ceramic constituent and a metal constituent, the average expansion coefficients of which are equal or close to each other, and also a metal oxide or complementary oxide, syncrystallizable with the refractory oxide, said complementary oxide providing an intimate bond between the refractory oxide and the metal constituent.

It is to be understood that "metal constituent" means all the metal elements forming part of the material, these elements having been introduced, in finely powdered form, either as metals or alloys.

The intervention of the syncrystallizable complementary oxide has a particularly high efficiency when said oxide is an oxide of a metal of the metallic constituent.

As refractory oxide, alumina is preferred but the invention comprises in its scope compositions in which the refractory oxide is magnesia, zirconia, glucinia, and thoria.

The invention provides, to be advantageously associated with alumina, a metal of the sixth group of the Mendelyeev Classification or an alloy of such a metal with other metals of the same groups or of the iron group which, as is known, includes iron, nickel and cobalt.

As the metallic constituent to be associated with magnesia, the invention provides a metal of the iron group or an alloy containing a metal of this group.

In the case of alumina and chromium, the invention contemplates providing the bond between these substances by the use of one or more metal sesquioxides isomorphous with alumina α such as $Cr_2O_3$ and $Mn_2O_3$.

The average expansion coefficients of the ceramic constituent and of the metal constituent should be sufficiently close to each other that, when subjected to thermal shocks, in use, the strains which develop in the material cannot break the bond provided by the complementary oxide. Practically, the average expansion coefficients of the metal constituent on one hand, and of the ceramic constituent on the other hand, should not differ from more than 20%. This value is liable to vary with the granulometry of the constituents and is at the highest when the granulometry is the finest.

The mechanical characteristics, resistance to thermal shock and to creep, vary with the concentrations of the various constituents and may be adapted to any individual instance of use.

However the proportions of the main constituents, i. e. refractory oxide and metal, have a considerable significance; some of the properties of the material and particularly those which disclose resistance to thermal shocks show rapid variations for some proportions, and class of materials may be defined which, although having common properties, have each their own particularity.

The materials comprising alumina, chromium oxide and chromium, this latter alone, or as alloy with other metals as mentioned above, are of primary importance. Such materials belong to several classes.

These materials have in common various properties, especially refractory character, resistance towards oxidation, the possibility of a good sintering, no creeping at 1,000° C., an expansion coefficient substantially constant and similar mechanic properties at low temperature.

Other properties show a linear variation with the relative proportion of the two main constituents. These properties are, for example, density, hardness, resistance to creeping at high temperature.

On the other hand, some other properties show sudden variations for given values of the percentage in the metal constituent, and this defines a number of classes differing from each other in said properties. Among these latter are: thermal conductivity, resistance to thermal shock.

*1st Class.*—The percentage in weight of the metal constituent, which is totally or partially chromium, is comprised between 2 to 5 and 25 to 30 of the total weight.

*2d Class.*—The limits are: 25 to 30% and 40 to 50%.

*3d Class.*—The limits are: 40 to 50% and 70 to 80%.

The proportions fixing the transition are dependent, inside these limits, of the granulometry of the metal constituent.

In each class, a number of families may be separated, according to the composition of the metal constituent. For example, the materials of the second class may be divided into three families, as hereafter:

A first family in which the materials comprise, as metal constituent, chromium only, and which are particularly resistant to corrosion;

A second family, the materials of which comprise, as metal constituent, chromium and a metal of the sixth group, and which are highly refractory;

The third family, the materials of which comprise, as metal constituent, chromium, a metal of the sixth group and one or several metals of the iron group and which are obtainable at low price.

For the construction of heat engine elements, the materials of the third class are preferred as they show simultaneously, beside the qualities which are common to all classes, a high resistance to thermal shock associated with a good refractory character.

For the production of heating rods, the materials of the first class are preferred as they show simultaneously, beside the qualities common to all the classes, an electric resistance high enough to require a not too high heating current.

For the production of propulsion jets nozzles for missiles to be used only once, for example, the materials of the second class, which have a thermal resistance of short duration, are very well adapted.

To produce a material according to the invention, the powder-metallurgical sintering techniques are advantageously employed. The constituents in the form of fine powders are intimately mixed, and the mixture may additionally contain a small amount of one or more mineralizing agents such as magnesia.

Forming is effected by pressing, casting or extrusion depending on the nature and concentrations of the respective constituents and the shape of the articles to be produced.

Sintering is accomplished at a temperature from 1,500 to 1,900° C., preferably in a controlled furnace atmosphere which depends on the character of the substances present in the mixture.

Thus, the additional oxide may be produced in situ through moderate oxidisation of the metal or alloy.

In some cases, it is possible to cause formation of covalent binary compounds adapted to promote the metal-to-oxide bond and improve the characteristics of the material.

In order to obtain a sintered material comprising alumina, chromium and chromium oxide, the invention provides preferably to heat the material to be sintered at first in a hydrogen atmosphere up to a temperature of about 1,200° C., then in a nitrogen atmosphere. A rapid sintering is thus obtained at a relatively low temperature and without swelling of the material, which would occur if the sintering were to be carried out permanently in a nitrogen atmosphere.

The speeding up of the sintering may be explained by the fact that at a temperature of about 1,600° C. a eutectic chromium nitride-chromium is formed, due to the presence of nitrogen and which wets the particles to be sintered, the sintering taking place in liquid phase.

The same advantageous results are obtainable, without swelling being observed, by replacing in the initial mixture the chromium powder with chromium nitride and carrying out the sintering in a nitrogen atmosphere, which provides, besides, at high temperatures, the same equilibrium chromium-chromium nitride.

Taking into account the contiguous phenomena, the proportions of the metals in the sintered material, and which are given hereafter in the examples, comprise not only the quantity which is to be found in the metal condition proper, but also to be found with nitrogen.

*Example 1*

The following constituents in the indicated proportions

| | Percent |
|---|---|
| $Al_2O_3$ | 69.7 |
| $Cr_2O_3$ | .3 |
| Fe | 18.0 |
| Ni | 3.0 |
| Cr | 6.0 |
| Mo | 3.0 | are used in the form of a powder of such fineness that more than 50% of the constituents comprise particles less than 5 microns in size, and the major part of the remainder of the particles being less than 100 microns in size. The powdered constituents are intimately mixed, after having desirably added thereto any of the lubricants generally used in the powder-metallurgy art, such as glycerine, camphor, paraffin, glycol, etc.

The resulting mixture is placed in a mold and compressed therein to a pressure approximating 2 tons per sq. cm. in an ordinary press.

The pressed article is placed in a furnace at a gradually increased temperature, in a controlled atmosphere: a hydrogen atmosphere up to 1,000 to 1,400° C., then a nitrogen atmosphere up to 1,700 to 1,750° C. At the end of this operation, a material is obtained which possesses the following characteristics: Tensile strength: 25 kg./sq. mm.; excellent erosion resistance, and resistance to oxidization and creep at high temperature.

*Example 2*

The following constituents in the following proportions

| | Percent |
|---|---|
| $Al_2O_3$ | 50 |
| $Cr_2O_3$ | .8 |
| Cr | 49.2 | are reduced to a fine powder such that more than 50% of the constituents comprise particles less than 5 microns in size while the major part of the remaining particles is less than 100 microns in size.

They are mixed with water to form a barbotine or slip of suitable viscosity in view of the shaped articles to be produced. This slip is stabilized by the addition thereto of an acid, suitably hydrochloric acid, in a proportion of a few thousands of one part of acid for one part mixture.

This paste or slip is cast in a plaster mold of plaster, baked clay or similar absorbent material. After a suitable wall thickness has been obtained, the excess slip is poured off.

If it is desired to produce a composite article, then this first slip or barbotine is replaced by a further barbotine of different composition, containing for example a refractory oxide, such as pure alumina. The substance or substances contained in this second barbotine settle over the initial article already formed. The particles size of the second barbotine is so selected that both layers will have an identical degree of shrinkage during the sintering operation. The part is removed from the mold and very slowly dried in air first at room temperature, then at 60° C.

The dried article is placed in a furnace in a nitrogen atmosphere and carried to 1,650° C., which is the sintering temperature.

After the sintering has been completed, the resulting article is non-permeable, possesses a breaking load of 20 to 30 kg./sq. mm., with excellent resistance to high temperature creep, oxidization and sharp temperature variations or thermal impact, thus making it particularly suitable for use as a jet-nozzle.

*Example 3*

The following substances in the following proportions:

| | Percent |
|---|---|
| $Al_2O_3$ | 56 |
| $Cr_2O_3$ | 4 |
| Cr | 30 |
| Mo | 10 | are used in the form of a fine powder, the granulometrical analysis similar to that defined above.

The constituents are mixed with a small amount of an organic solvent, e. g., ether, alcohol, benzene and a lubricant such as stearic acid or a stearate.

The paste may be subjected to a vacuum to remove any bubbles formed in it. The desired articles are then shaped by extrusion.

The extruded article is slowly dried in air, first at room temperature, then at 60° C. The dried article is placed in a furnace in which a controlled atmosphere is maintained as follows: hydrogen atmosphere up to 1,000–1,400° then nitrogen atmosphere up to 1,650–1,750° C.

Example 4

The following constituents are used in the indicated proportions:

| | |
|---|---|
| $Al_2O_3$ | Under 70%. |
| Cr | Over 30%. |
| $Cr_2O_3$ | Traces. |

The shaping is accomplished by pressing, coating or extrusion. It is thus possible to obtain a rod of such an electric conductivity that it may be used as heating resistor. This rod may optionally be coated with a protective coating, of e. g. alumina. Such a rod is capable of withstanding temperatures up to 1,600° C. for long periods of time, even in an oxidizing atmosphere.

Example 5

The constituents and their proportions are as follows:

| | Percent |
|---|---|
| $Al_2O_3$ | 30 |
| Cr | 69.5 |
| $Cr_2O_3$ | .5 |

They are used in the form of a fine powder, the granulometrical analysis being similar to that mentioned in Example 1.

They are thoroughly mixed after advantageous admixture of a lubricant, as hereabove mentioned.

The material is placed in a mold, then compressed to a pressure of 1 ton to 1.5 ton/sq. cm. The article is then placed in a furnace at a gradually increased temperature, in a nitrogen atmosphere and heated at 1,580 to 1,600°.

At the end of this operation, a nonpermeable article is obtained having a tensile strength of about 20 kg./sq. mm. and an excellent resistance to thermal shocks.

Example 6

The constituents and their proportions are as follows:

| | Percent |
|---|---|
| $Al_2O_3$ | 21 |
| MgO | 7 |
| Cr | 71.5 |
| $Cr_2O_3$ | .5 |

These constituents are used in the form of fine powders which, for alumina and chromium, have a granulometrical analysis similar to that mentioned in Example 1; as far as the mineralizing agent is concerned, magnesia in the present case, it is introduced as an extremely fine powder advantageously obtained through calcination of the precipitated hydrocarbonate.

The whole is shaped by pressure, as in Example 5 and is placed in a furnace at a gradually increasing temperature in controlled atmosphere; an hydrogen atmosphere is maintained up to 1,000–1,400°, then a nitrogen atmosphere up to 1,580–1,600°.

Despite the use of the alternated atmosphere which avoids the swelling of the mass during the sintering, a slight swelling is observed in this case from 1,000° and reaches its maximum at about 1,300°. This is due to the combination of alumina with magnesia which gives rise to an armature whch is consolidated when the metal constituent melts.

In the Examples 2—4—5—6, the chromium oxide may be obtained "in situ," before the sintering by partial oxidation of the chromium below 1,200°, for example in admitting into the furnace atmosphere a quantity of oxygen or steam calculated according to the proportion of chromium oxide to obtain.

What we claim is:

1. A method for producing a shaped article of sintered refractory material comprising the steps of shaping a mixture in finely divided form of at least 20% alumina, 2–80% chromium and .3–4% chromium oxide, and heating the shaped mixture first in a hydrogen atmosphere up to about 1,200° C. then in a nitrogen atmosphere to the sintering temperature.

2. A sintered refractory material having substantially the following composition:

| | Percent |
|---|---|
| $Al_2O_3$ | 67.7 |
| $Cr_2O_3$ | 0.3 |
| Fe | 18.0 |
| Ni | 3.0 |
| Cr | 6.0 |
| Mo | 3.0 |

3. A sintered refractory material having substantially the following composition:

| | Percent |
|---|---|
| $Al_2O_3$ | 50 |
| $Cr_2O_3$ | 0.8 |
| Cr | 49.2 |

4. A sintered refractory material having substantially the following composition:

| | Percent |
|---|---|
| $Al_2O_3$ | 56 |
| $Cr_2O_3$ | 4 |
| Cr | 30 |
| Mo | 10 |

5. A sintered refractory material having substantially the following composition:

| | Percent |
|---|---|
| $Al_2O_3$ | 30 |
| Cr | 69.5 |
| $Cr_2O_3$ | 0.5 |

6. A sintered refractory material having substantially the following composition:

| | Percent |
|---|---|
| $Al_2O_3$ | 21 |
| MgO | 7 |
| Cr | 71.5 |
| $Cr_2O_3$ | 0.5 |

7. A refractory material consisting essentially of, in intimately bonded relationship resulting from sintering: alumina in an amount at least equal to 20% by weight, 2–80% chromium and chromium oxide in an amount comprised between 0.3% and 4%.

8. A refractory material consisting essentially of, in intimately bonded relationship resulting from sintering: alumina in an amount at least equal to 20% by weight, 2–80% chromium and another metal selected from the group consisting of molybdenum and tungsten, the average coefficient of expansion of the metallic constituent comprising chromium and said other metal differing by no more than 20% from that of alumina, and chromium oxide in an amount comprised between 0.3% and 4%.

9. A refractory material consisting essentially of, in intimately bonded relationship resulting from sintering: alumina in an amount at least equal to 20% by weight, 2–80% chromium and an iron-group metal, the average coefficient of expansion of the metallic constituent comprising chromium and said other metal differing by no more than 20% from that of alumina, and chromium oxide in an amount comprised between 0.3% and 4%.

10. A refractory material consisting essentially of, in intimately bonded relationship resulting from sintering: alumina in an amount at least equal to 30% by weight, 2–80% chromium and an alloy of a metal selected from the group consisting of molybdenum and tungsten with an iron-group metal, the metallic constituent comprising chromium and the said alloy having an average coefficient of expansion differing by less than 20% from that of alumina, and chromium oxide in an amount comprised between 0.3% and 4%.

11. A refractory material consisting essentially of, in intimately bonded relationship resulting from sintering: alumina, chromium in an amount comprised between 25 and 50% by weight, and chromium oxide in an amount comprised between 0.3% and 4%.

12. A refractory material consisting essentially of, in intimately bonded relationship resulting from sintering: alumina, a metallic constituent comprising chromium, a metal selected from the group consisting of molybdenum and tungsten and an iron-group metal, the average coefficient of expansion of the metallic constituent differing from that of alumina by less than 20%, the proportion of the metallic constituent of the total weight being comprised between 25 and 50%, and chromium oxide in an amount comprised between 0.3% and 4%.

13. A refractory material consisting essentially of, in intimately bonded relationship resulting from sintering: alumina, chromium in an amount comprised between 40 and 80% by weight, and chromium oxide in an amount comprised between 0.3% and 4%.

14. A refractory material consisting essentially of, in intimately bonded relationship resulting from sintering: alumina, a metallic constituent comprising chromium, a metal selected from the group consisting of molybdenum and tungsten and an iron-group metal, the average coefficient of expansion of the metallic constituent differing by less than 20% from that of alumina, the metallic constituent being in an amount comprised between 40 and 80% by weight, and chromium oxide in an amount comprised between 0.3% and 4%.

15. A refractory material consisting essentially of, in intimately bonded relationship resulting from sintering: alumina in an amount greater than 20% by weight, 2–80% of a metallic constituent comprising chromium and having a coefficient of expansion differing by less than 20% from that of alumina, chromium oxide in an amount comprised between 0.3% and 4%, and magnesia as a mineralizing agent.

References Cited in the file of this patent

UNITED STATES PATENTS

| | | |
|---|---|---|
| 2,224,595 | Dawihl | Dec. 10, 1940 |
| 2,279,003 | Matush | Apr. 7, 1942 |
| 2,431,660 | Gandorzi | Nov. 25, 1947 |
| 2,554,343 | Paul | May 22, 1951 |
| 2,568,157 | Lepp | Sept. 18, 1951 |
| 2,581,252 | Goetzel et al. | Jan. 1, 1952 |
| 2,656,596 | Conant et al. | Oct. 27, 1953 |
| 2,672,426 | Grubel | Mar. 16, 1954 |

FOREIGN PATENTS

| | | |
|---|---|---|
| 676,441 | Great Britain | July 30, 1952 |